United States Patent
Botero Halblaub et al.

(10) Patent No.: US 12,252,145 B2
(45) Date of Patent: Mar. 18, 2025

(54) SENSOR DATA GENERATION FOR CONTROLLING AN AUTONOMOUS VEHICLE

(71) Applicant: Siemens Aktiengesellschaft, Munich (DE)

(72) Inventors: Andrés Botero Halblaub, Kirchseeon (DE); Hermann Georg Mayer, Prien am Chiemsee (DE); Jan Christoph Wehrstedt, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 258 days.

(21) Appl. No.: 17/835,033

(22) Filed: Jun. 8, 2022

(65) Prior Publication Data
US 2022/0410915 A1    Dec. 29, 2022

(30) Foreign Application Priority Data
Jun. 25, 2021    (EP) .................................... 21181851

(51) Int. Cl.
*B60W 60/00*    (2020.01)
*B60W 50/06*    (2006.01)
*H04W 4/48*    (2018.01)
*B60W 50/00*    (2006.01)

(52) U.S. Cl.
CPC .......... *B60W 50/06* (2013.01); *B60W 60/001* (2020.02); *H04W 4/48* (2018.02); *B60W 2050/0052* (2013.01); *B60W 2556/45* (2020.02)

(58) Field of Classification Search
CPC ............... B60W 50/06; B60W 60/001; B60W 2556/45; B60W 2050/0052; H04W 4/48
USPC ........................................................ 701/24
See application file for complete search history.

(56) References Cited

U.S. PATENT DOCUMENTS

| | | | |
|---|---|---|---|
| 11,543,263 B1* | 1/2023 | Bosse | G06N 20/00 |
| 2010/0106356 A1* | 4/2010 | Trepagnier | G05D 1/0214 |
| | | | 701/25 |
| 2017/0248963 A1 | 8/2017 | Levinson et al. | |
| 2018/0349522 A1* | 12/2018 | Aphek | G06F 30/13 |

(Continued)

FOREIGN PATENT DOCUMENTS

CN        107678306 A        2/2018

OTHER PUBLICATIONS

Gabb, Michael et al: "Infrastructure-supported Perception and Track-level Fusion using Edge Computing"; 2019 IEEE Intelligent Vehicles Symposium (IV). IEEE; 9. Jun. 2019 (Jun. 9, 2019), pp. 1739-1745, XP033606020.

*Primary Examiner* — Tiffany P Young
*Assistant Examiner* — Michael T Dowling
(74) *Attorney, Agent, or Firm* — Schmeiser, Olsen & Watts LLP

(57) ABSTRACT

A method and an apparatus for generating sensor data for controlling an autonomous vehicle in an environment is provided, such as driverless transport vehicles in a factory for example. Sensor positions of static sensors and the sensors of autonomous vehicles are defined in a global coordinate system on the basis of an environment model, such as a BIM model for example. Sensor data is centrally generated in this global coordinate system for all sensors as a function of these sensor positions. The sensor data is then transformed into a local coordinate system of an autonomous vehicle and transferred for controlling the autonomous vehicle.

12 Claims, 5 Drawing Sheets

(56) References Cited

U.S. PATENT DOCUMENTS

Figure 1:
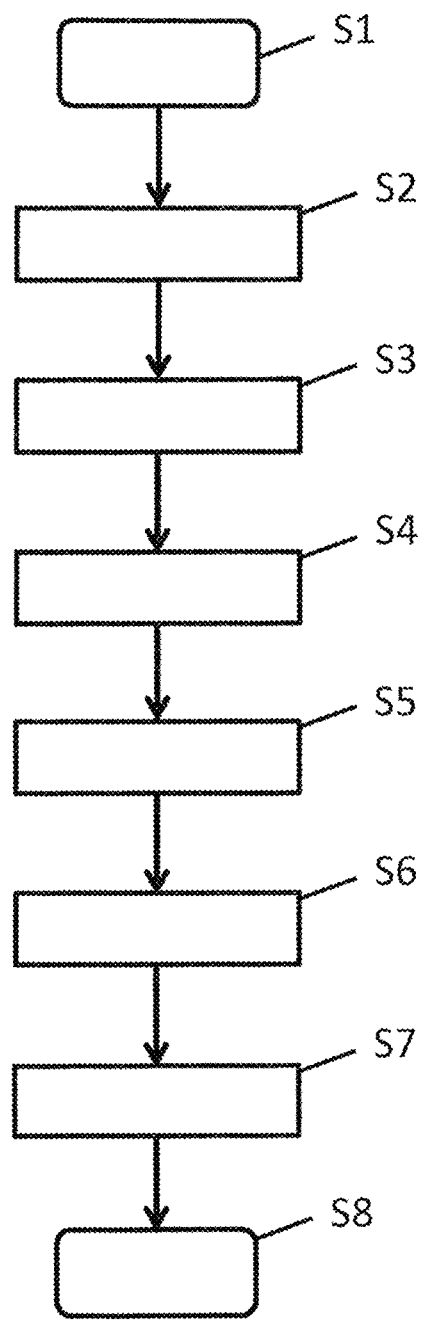

| | | | |
|---|---|---|---|
| 2019/0179979 A1* | 6/2019 | Melick | G06F 30/367 |
| 2019/0301873 A1* | 10/2019 | Prasser | G01C 21/3848 |
| 2020/0174493 A1 | 6/2020 | Lin et al. | |
| 2020/0241545 A1* | 7/2020 | Anthony | G05D 1/0088 |
| 2020/0388159 A1* | 12/2020 | Degerman | G08G 1/166 |
| 2022/0221293 A1* | 7/2022 | Hara | B60W 30/143 |

\* cited by examiner

SENSOR DATA GENERATION FOR CONTROLLING AN AUTONOMOUS VEHICLE

CROSS-REFERENCE TO RELATED APPLICATIONS

This application claims priority to EP Application No. 21181851.3, having a filing date of Jun. 25, 2021, the entire contents of which are hereby incorporated by reference.

FIELD OF TECHNOLOGY

The following relates to a computer-implemented method, an apparatus and a computer program product for generating sensor data for controlling an autonomous vehicle in an environment, such as a driverless transport vehicle (Automated Guided Vehicle; AGV) in a factory, for example.

BACKGROUND

As a rule, production processes in factories are simulated in advance in a virtual environment (virtual commissioning) in order to guarantee the correct interaction of all components before real commissioning of the plant, to optimize time sequences and to identify potential faults, such as collisions for example. This presents a challenge, however, in particular with production scenarios such as with individualized production for example, because often production sequences are carried out by means of dynamic components, in particular autonomous vehicles such as AGVs for example. AGVs can receive, for example, material at any output points and transport it to any locations for further production. The behavior is thereby no longer deterministic however and for this reason cannot be simulated beforehand. AGVs are no longer incorporated in strictly predefined sequences and have to define the state of their environment and optionally their position by way of sensors, therefore. As a rule this takes place by way of optical sensors such as cameras, LIDAR or laser distance measurement. For a realistic test of the AGVs in virtual commissioning and/or control of the AGVs in a real production environment, data from these sensors has to be present accordingly to be able to determine a correct reaction of the AGVs to it.

SUMMARY

An aspect relates to provide sensor data for controlling an autonomous vehicle.

In accordance with a first aspect, embodiments of the invention relate to a computer-implemented method for generating sensor data for controlling an autonomous vehicle in an environment in which at least one further autonomous vehicle is situated, with the following method steps:
a) reading in an environment model of the environment, wherein
  the environment model has a global coordinate system and
  the environment model comprises first sensor positions of static sensors in the environment and environment information in this global coordinate system and sensor parameters of the static sensors,
b) generating a time stamp,
c) reading in second sensor positions and sensor parameters of sensors, which are coupled to the autonomous vehicles, and providing the second sensor positions in coordinates of the global coordinate system,
d) generating sensor data for the static sensors and the sensors of the autonomous vehicles as a function of the respective sensor parameters and the respective first or second sensor positions and taking into account the environment information in coordinates of the global coordinate system, wherein the generated time stamp is assigned to the generated sensor data,
e) selecting at least one of the autonomous vehicles,
f) transforming the generated sensor data into a local coordinate system of the selected autonomous vehicle, and
g) transmitting the transformed sensor data to a controller of the selected autonomous vehicle for controlling the selected autonomous vehicle in the environment as a function of the transformed sensor data.

If it is not indicated otherwise in the following description, the terms "carry out", "calculate", "computer-aided", "compute", "define", "generate", "configure", "reconstruct" and the like refer to actions and/or processes and/or processing steps which change and/or generate data and/or transfer the data into other data, it being possible for the data to be presented or to exist in particular as physical variables, for example as electrical pulses. In particular, the expression "computer" should be interpreted as broadly as possible in order to cover in particular all electronic devices with data processing properties. Computers can thus be for example personal computers, servers, programmable controllers (PLC), handheld computer systems, pocket PC devices, mobile phones and other communications devices, which can process data with the aid of a computer, processors and other electronic devices for data processing.

In connection with embodiments of the invention a "storage unit" can be taken to mean, for example, a volatile storage facility in the form of Random Access Memory (RAM) or a permanent storage facility such as a hard drive or a data carrier.

In connection with embodiments of the invention a "module" can be taken to mean, for example, a processor for storing program commands. For example, the processor is specifically adapted to execute the program commands in such a way that the processor executes functions in order to implement or achieve the inventive method or a step of the inventive method.

In connection with embodiments of the invention "provision", in particular in relation to data and/or information, can be taken to mean, for example, computer-aided provision. Provision takes place, for example, via an interface, such as a network interface for example, a communications interface or an interface to a storage unit. Appropriate data and/or information can be transferred and/or transmitted and/or retrieved and/or received via an interface of this kind, for example during provision.

A "technical system" can be taken to mean, in particular, a machine, a device, or also a plant comprising a plurality of machines. For example, the technical system is a production machine or a machine tool.

In connection with embodiments of the invention an "environment" can be, for example, a building/structure, such as a factory or production plant for example, or a transport infrastructure. The environment is characterized, for example, by environmental features or environment information, such as routes, walls, corners, obstacles, etc. for example.

In connection with embodiments of the invention an "environment model" can, in particular, be taken to mean a computer-aided/computer-readable model or simulation model, which comprises information, features and/or properties of the environment. In particular the environment can be simulated or mapped in a computer-aided manner with an environment model. For example, the environment model can be a structure model of a structure, an infrastructure model of a (transport) infrastructure or a building model of a building, such as a factory/production plant for example. In embodiments, the environment model comprises environment information, such as routes/paths, obstacles, etc. for example. Environment information can also be taken to mean structure data/building data.

A "sensor" can, in particular, be taken to mean a detector, a transducer or measuring sensor or probe. A physical sensor is in particular a hardware component or a hardware part (hardware sensor), which quantitatively detects/measures physical variables. The sensor outputs a measured value or value of the measured variable. A static sensor has, in particular, a fixed position and/or a predefined field of vision/field of view.

A "time stamp" can in particular be taken to mean a digital time stamp. A time stamp can be used in particular to assign a unique time to an event. In embodiments, a globally applicable time stamp can be generated and used.

It is an advantage of embodiments of the present invention that for a given time, sensor data can be globally generated jointly and simultaneously for a plurality of autonomous vehicles. The sensor data is generated on the basis of an environment model, which provides a global coordinate system. The sensor data generated in this way can be converted for a single vehicle by including a changing sensor position and optionally a time delay. For this, the generated sensor data is transformed into a local coordinate system of the autonomous vehicle.

Embodiments of the invention make it possible, in particular, to generate sensor data for the control of autonomous vehicles. For example, the sensor data can be used for control and/or virtual commissioning of AGVs in a factory or production plant. For virtual commissioning the sensor data may be simulated in a computer-aided manner. Alternatively, the sensor data can also be centrally generated for real control of autonomous vehicles and transferred to individual autonomous vehicles via a communications network. A single autonomous vehicle can thus obtain information from sensors, which are not assigned to this vehicle or coupled thereto. This improves the field of vision of the vehicle in particular and therewith also the accuracy of control.

In one embodiment of the method, the environment model can be a computer-readable building model.

In embodiments, the computer-readable building model is what is known as a BIM model (Building Information Modelling, BIM for short), in other words an information model of a building for a digital building modeling. A BIM model may comprise sensor positions of statically installed sensors and a type of the respective sensor and further sensor parameters. The BIM model can be used to define a global coordinate system in which participating autonomous vehicles can move.

In a further embodiment of the method, the sensor data for the static sensors and the sensors of the autonomous vehicles can be centrally generated for a time stamp.

For example, the sensor data can be generated on a central computing unit, which may be coupled to all available sensors for data exchange. Alternatively, the sensor data can be centrally simulated for all available sensors. The sensor data thereby exists centrally in a global coordinate system.

In a further embodiment of the method, the time stamp can be updated in predefined time increments and the sensor data can be generated anew for the updated time stamp.

Sensor data, which can be used for control of at least one autonomous vehicle, is thus generated for each time increment.

In a further embodiment of the method, the sensor data can be transformed into the local coordinate system of the selected autonomous vehicle by taking into account a transmission latency for transmitting the sensor data to the selected autonomous vehicle.

As a result, sensor data can be predicted for predefined time increment. For example, a movement can be extrapolated in this way.

In a further embodiment of the method, the sensor data can be transformed into the local coordinate system of the selected autonomous vehicle as a function of generated sensor data, to which a preceding time stamp is assigned.

As a result, for example a speed of a detected object can be determined and be taken into account in the coordinate transformation.

In a further embodiment of the method, the sensor data can be generated by means of a computer-aided sensor simulation.

Data from modeled sensors can be generated by means of a computer-aided sensor simulation. A sensor simulation can be carried out in particular as a function of environment information, which is provided for example by the environment model. For example data, which a sensor detects at a predefined position as a function of a predefined sensor type, field of vision, sensitivity, etc., can be simulated in a computer-aided manner with a sensor simulation. In other words, a computer-aided sensor simulation supplies, for example, output values of a sensor, taking into account the environment information. In particular, further information, such as for example speed of a vehicle, a steering movement, etc., can be taken into account in a sensor simulation.

In a further embodiment of the method, a quality of at least some of the generated sensor data can be reduced and this modified sensor data can be transformed into the local coordinate system of the selected autonomous vehicle at a lower quality.

For example, a noise signal on the generated sensor data can be modulated and/or a field of view of the respective sensor can be (artificially) restricted. The generated data can be modified in such a way, in particular with sensor data generation by means of a computer-aided sensor simulation, and can be presented more realistically as a result.

In a further embodiment of the method, the generated sensor data can be filtered in the global coordinate system as a function of the position of the selected autonomous vehicle and only the filtered sensor data transformed into the local coordinate system of the selected autonomous vehicle and transferred to the selected autonomous vehicle.

This makes is possible, in particular, to transfer only that sensor data to the vehicle which is relevant to the vehicle.

In a further embodiment of the method, the static sensors and the sensors of the autonomous vehicles and/or the autonomous vehicles can be connected together by a communications network.

For example, a communications network of this kind can be a 5G network. The sensor data can be centrally generated by way of the network and then transferred to the respective vehicles.

In a further embodiment of the method, the selected autonomous vehicle can be controlled in a simulation environment as a function of the transformed sensor data.

For example, this can be a virtual commissioning of the autonomous vehicle. For this, a movement of the autonomous vehicle in the environment can be simulated, wherein the simulated sensor data is used to control reactions of the autonomous vehicle.

In a further embodiment of the method, the environment can be a factory and the autonomous vehicles can be driverless transport vehicles (Automated Guided Vehicles, AGVs).

In accordance with a second aspect, embodiments of the invention relate to an apparatus for generating sensor data for controlling an autonomous vehicle in an environment in which at least one further autonomous vehicle is situated, wherein the apparatus comprises:
a) a first interface, which is adapted to read in an environment model of the environment, wherein
    the environment model has a global coordinate system and
    the environment model comprises first sensor positions of static sensors in the environment and environment information in this global coordinate system and sensor parameters of the static sensors,
b) a time stamp generator, which is adapted to generate a time stamp,
c) a second interface, which is adapted to read in second sensor positions and sensor parameters of sensors, which are coupled to the autonomous vehicles, and to provide the second sensor positions in coordinates of the global coordinate system,
d) a sensor data generator, which is adapted to generate sensor data for the static sensors and the sensors of the autonomous vehicles as a function of the respective sensor parameters and the respective first or second sensor positions and taking into account the environment information in coordinates of the global coordinate system, wherein the generated time stamp is assigned to the generated sensor data,
e) a selection module, which is adapted to select at least one of the autonomous vehicles,
f) a transformation module, which is adapted to transform the generated sensor data into a local coordinate system of the selected autonomous vehicle,
and
g) a transmission module, which is adapted to transmit the transformed sensor data to a controller of the selected autonomous vehicle for controlling the selected autonomous vehicle in the environment as a function of the transformed sensor data.

The apparatus can be coupled, in particular, to the controller of the selected autonomous vehicle, for example by a communications network, in order to transfer the sensor data.

Furthermore, embodiments of the invention relates to a computer program product (non-transitory computer readable storage medium having instructions, which when executed by a processor, perform actions), which can be directly loaded into a programmable computer, comprising program code components, which on execution of the program by a computer cause it to carry out the steps of an inventive method.

A computer program product can be provided or supplied for example on a storage medium, such as for example memory card, USB stick, CD-ROM, DVD, a non-volatile/permanent storage medium (non-transitory storage medium) or also in the form of a data file downloadable from a server in a network.

BRIEF DESCRIPTION

Figure 2:
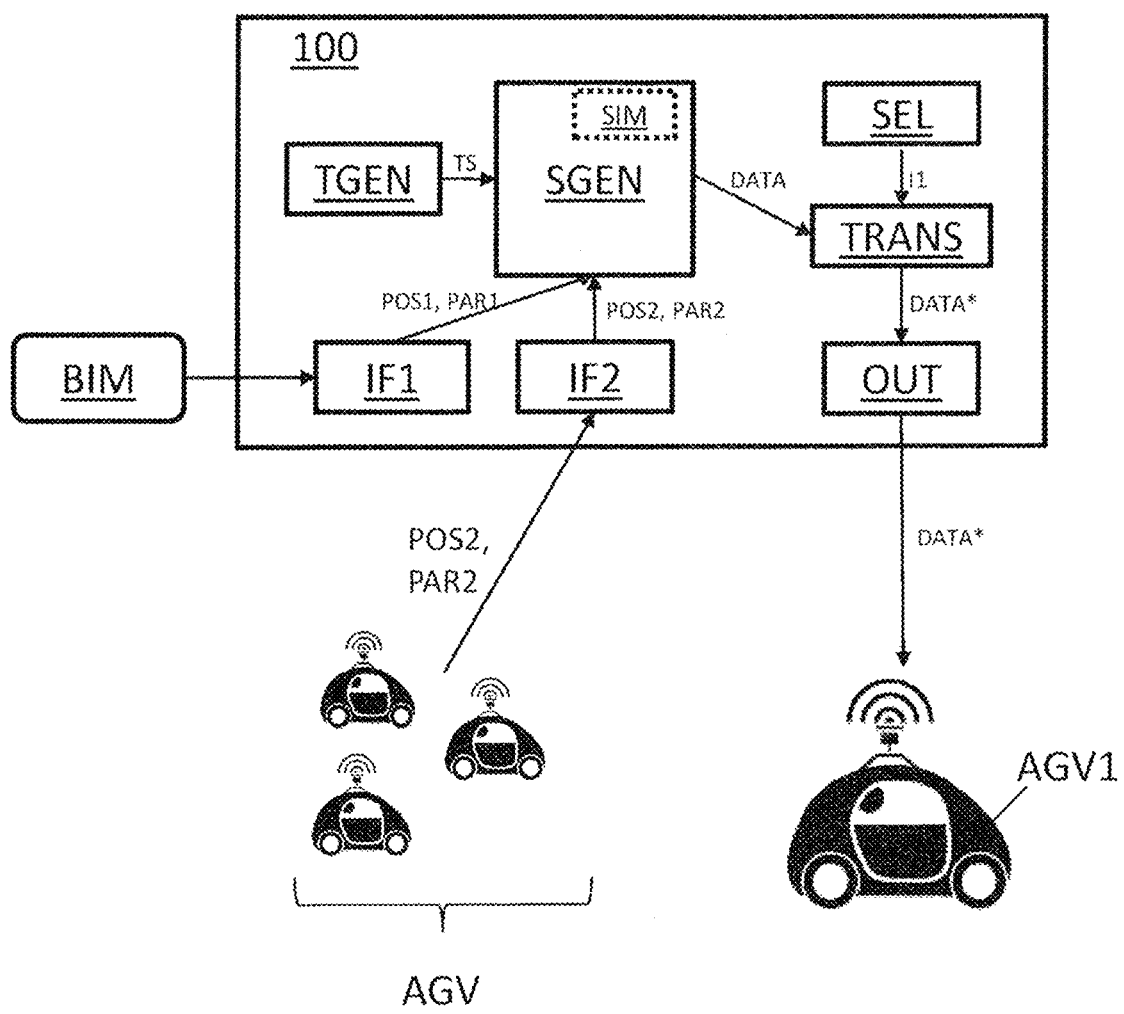
Figure 3:
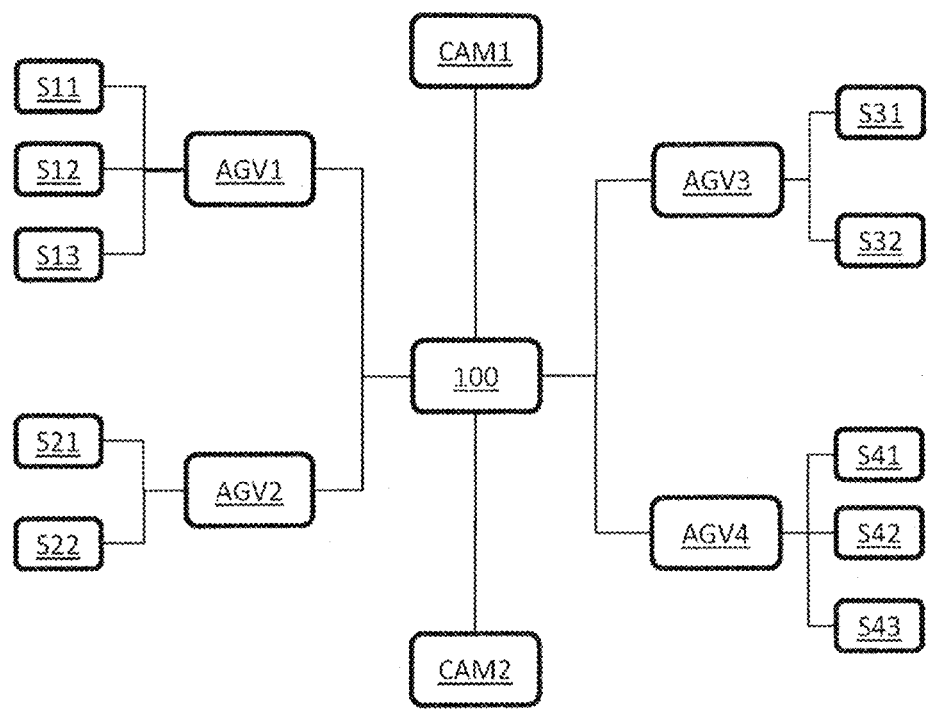
Figure 4:
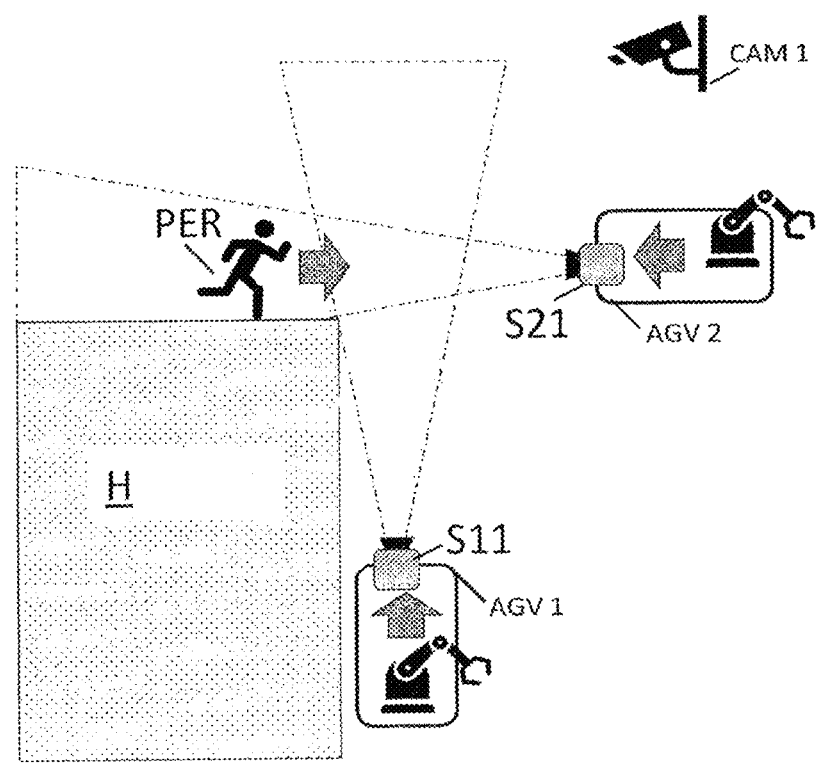

Some of the embodiments will be described in detail, with reference to the following figures, wherein like designations denote like members, wherein:

FIG. 1: shows a first exemplary embodiment of an inventive method;

FIG. 2: shows a first exemplary embodiment of an inventive apparatus;

FIG. 3: shows a second exemplary embodiment of an inventive apparatus;

FIG. 4: shows a second exemplary embodiment of an inventive method; and

Figure 5:
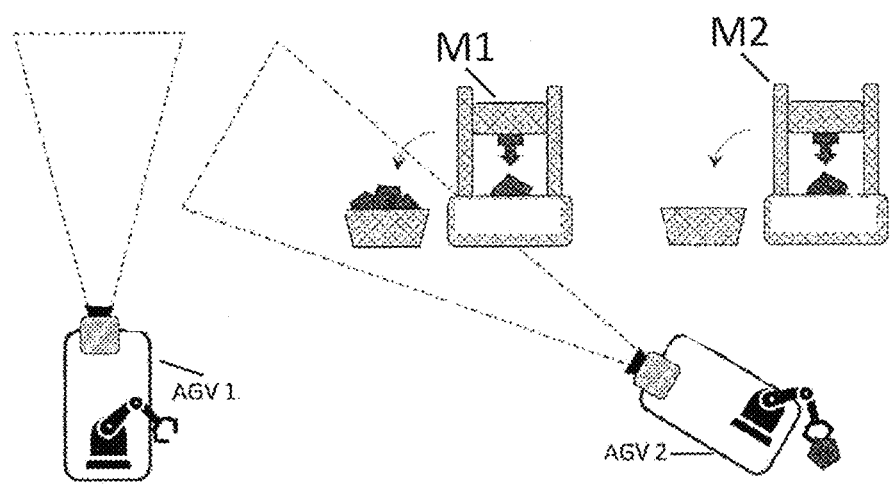

FIG. 5: shows a third exemplary embodiment of an inventive method.

Mutually corresponding parts are provided with identical reference numerals in all figures.

DETAILED DESCRIPTION

In particular, the following exemplary embodiments show only exemplary implementation options as to how, in particular, such implementations of the inventive teaching could look since it is not possible or expedient or necessary to cite all of these implementation options for an understanding of embodiments of the invention.

In particular, these customary implementation variants known to the person skilled in the art can be achieved solely by hardware (components) or solely by software (components). Alternatively and/or in addition, as part of his expert skill the person skilled in the art can select largely any inventive combinations of hardware (components) and software (components) in order to realize inventive implementation variants.

FIG. 1 shows a flow diagram as a first exemplary embodiment of an inventive method for generating sensor data for controlling an autonomous vehicle in an environment. For example, controlling an autonomous vehicle in an environment can be simulated in a computer-aided manner. The environment can be, for example, a building or a transport infrastructure. A large number of autonomous vehicles (AVs), such as autonomous transport vehicles (Automated Guided Vehicles, AGVs) may be situated in the environment in embodiments.

Sensor data, which can be used to control one of these autonomous vehicles, is to be generated. The autonomous vehicle can be (virtually) controlled, for example in a simulated environment, on the basis of the sensor data, in other words the movement and/or control of the autonomous vehicle in the environment can be simulated in a computer-aided manner on the basis of the generated sensor data. Alternatively, the generated sensor data can also be used to control the autonomous vehicle in the real environment.

In the first step S1, an environment model of the environment is read in. For example, the environment model is a BIM model of the building. The environment model has a global coordinate system, in other words in particular positions of environmental features, such as for example routes, walls, obstacles, etc., are given in this coordinate system and stored in the environment model. In addition the environment model comprises first sensor positions of static sensors, such as permanently installed cameras for example, in the environment and the environment model comprises sensor parameters of the static sensors. A static sensor is in particular immobile, in other words its sensor position and/or its field of vision may not change in embodiments. A sensor parameter can be, for example, a field of vision, a sensitivity, a sensor type, a resolution, etc. One sensor parameter may be uniquely assigned to one respective sensor in embodiments.

In embodiments, the environment model comprises all sensor information from the static sensors in the environment, such as of the building or in the building for example.

In the next step S2, a time stamp is generated. In embodiments, the following steps S3 to S7 are carried out for this time stamp, in other words when the time stamp is updated, the steps are repeated for the updated time stamp.

In the next step S3, second sensor positions and sensor parameters of sensors, which are coupled to the autonomous vehicles, are read in. The autonomous vehicles may comprise sensors, such as cameras or distance measuring devices for example, which are attached, for example, to a respective autonomous vehicle. The sensor positions of the respective sensors are thus dependent on the positions of the respective vehicles. The sensors of the autonomous vehicles can also be referred to as moving sensors since the sensor position and/or the field of vision of these sensors can change with time. The sensor positions of the sensors of the autonomous vehicles and/or the positions of the autonomous vehicles are provided for the generated time stamp in coordinates of the global coordinate system.

In the next step S4, sensor data is generated for the static sensors and the (moving) sensors of the autonomous vehicles as a function of the respective sensor parameters of the respective sensors and as a function of the respective first sensor positions of the static sensors or the second sensor positions of the moving sensors in coordinates of the global coordinate system and taking into account the environment information. In addition, the generated time stamp is assigned to the generated sensor data. In other words, the sensor data is generated for this time increment and receives the generated time stamp.

For example, sensor data is generated for a camera permanently installed on an autonomous vehicle, in other words data is generated, which the camera outputs as a function of the camera position, the camera field of view, the camera sensitivity, etc. In particular environment information, such as an obstacle for example, is taken into account in the generation of the sensor data. Consequently, the generated camera data can comprise the obstacle or information relating to the obstacle, if at the given time the obstacle is situated in the camera field of vision.

Sensor data is generated for all existing sensors, with environment information of the environment from the environment model being taken into account. In addition, position information of the autonomous vehicles can be taken into account in the generation of the sensor data.

In embodiments, the sensor data is centrally generated and provided. The sensor data can be generated, for example centrally, by means of a sensor simulation.

In the next step S5, at least one of the autonomous vehicles is selected. The selection can be made on the basis of a predefined order, on the basis of a selection criterion or randomly.

In the next step S6, the generated sensor data is transformed into a local coordinate system of the selected autonomous vehicle. Thus, for example, sensor data from a static camera is transformed into the coordinate system of the selected vehicle, so this data is present from the perspective of the vehicle.

In the next step S7, the transformed sensor data is transferred to a controller of the selected autonomous vehicle.

In the next step S8, the selected vehicle can be controlled as a function of the transformed sensor data in the environment. Alternatively or in addition, the transformed sensor data can be used for training artificial intelligence, such as an artificial neural network for example, which is adapted, for example, to aid control of an autonomous vehicle. Thus on the basis of the generated sensor data, a machine learning method can be trained, which can make better predictions for planning combined with the simulation and adjusts the events and habits of a specific environment. For example, a hybrid model-predictive-control approach consisting of artificial intelligence and a simulation model can be used.

FIG. 2 shows in a schematic representation an exemplary embodiment of an inventive apparatus 100 for generating sensor data for controlling an autonomous vehicle AGV1 in an environment. For example a large number of autonomous vehicles is moving in the environment, for example a factory or a transport infrastructure. Sensor data is necessary to control the autonomous vehicles. The apparatus 100 is adapted to centrally generate and output such sensor data for the autonomous vehicles AGV.

The apparatus 100 can generate sensor data by means of a sensor simulation SIM for example. This generated or simulated sensor data can be used for example for a computer-aided simulation of the movement and/or control of the autonomous vehicles, such as for a virtual commissioning of the autonomous vehicles for example.

Alternatively, the apparatus 100 can generate and provide sensor data centrally for the autonomous vehicles AGV. For this embodiment, the apparatus 100 can be linked to the autonomous vehicles AGV and/or the static sensors in the environment via a 5G communications network.

The apparatus 100 comprises a first interface IF1, a second interface IF2, a time stamp generator TGEN, a sensor data generator SGEN, a selection module SEL, a transformation module TRANS and a transmission module OUT.

The first interface IF1 is adapted to read in an environment model BIM of the environment, with the environment model BIM having a global coordinate system and the environment model comprising first sensor positions POS1 of static sensors in the environment and environment information in this global coordinate system and sensor parameters PAR1 of these static sensors. The environment model can be, for example, a digital information model of the environment. For example, the environment model is a BIM model if the environment is a building/structure. For example, it can be a production plant in which AGVs move.

The time stamp generator TGEN is adapted to generate a global time stamp TS. The time stamp TS is required to assign a unique global time to generated sensor data. The time stamp can be updated in predefined time increments. When the time stamp TS is updated the sensor data is generated anew for the updated time stamp.

The second interface IF2 is adapted to read in second sensor positions POS2 and sensor parameters PAR2 from sensors, which are coupled to the autonomous vehicles AGV, and to provide the second sensor positions in coordinates of the global coordinate system.

The sensor data generator SGEN is adapted to generate sensor data DATA for the static sensors and the sensors of the autonomous vehicles as a function of the respective sensor parameters PAR1, PAR2 and the respective first or second sensor positions POS1, POS2 in coordinates of the global coordinate system, with the generated time stamp TS being assigned to the generated sensor data.

The sensor data DATA can be generated for example by means of a computer-aided sensor simulation SIM. In addition, a quality of the generated sensor data can be reduced and provided in such a way. The quality of the simulated sensor data can consequently emulate a realistic quality of real data.

In particular, at least one environmental feature can be detected on the basis of the generated sensor data. An environmental feature can be, for example, an obstacle, a wall, a bottleneck, etc. An environmental feature can also be a person, who is moving in the environment. A position of the environmental feature can thus be provided in coordinates of the global coordinate system.

The selection module SEL is adapted to select at least one of the autonomous vehicles and to transfer information I1 about this selection to the transformation module TRANS.

The transformation module TRANS is adapted to transform the generated sensor data DATA and/or the detected environmental features into a local coordinate system of the selected autonomous vehicle AGV1. In particular a transmission latency, which occurs on a transfer of the sensor data to the selected vehicle, can be taken into account in the coordinate transformation. For the transformation, the information I1 about the selected vehicle and at least the position of the selected vehicle for the applicable time stamp is transferred to the transformation module TRANS. In embodiments, the transformation module TRANS transforms all sensor data DATA into the local coordinate system of the selected autonomous vehicle AGV1, which is relevant to the selected vehicle AGV1. For example, the generated sensor data DATA can be filtered as a function of the position of the selected autonomous vehicle in the global coordinate system and only the filtered sensor data DATA is transformed into the local coordinate system of the selected autonomous vehicle AGV1 and transferred to the selected autonomous vehicle AGV1.

The sensor data DATA can in particular also be transformed into the local coordinate system of the selected autonomous vehicle as a function of previously generated further sensor data, to which a preceding time stamp is assigned. For example, new sensor data can be extrapolated for the current time stamp on the basis of the previously generated sensor data.

If an environmental feature was detected on the basis of the sensor data, in particular only the environmental feature can be transformed into the local coordinate system.

The transmission module OUT is adapted to transfer the transformed sensor data DATA* to a controller of the selected autonomous vehicle AGV1 for controlling the selected autonomous vehicle in the environment as a function of the transformed sensor data DATA*.

FIG. 3 shows in a schematic representation a further exemplary embodiment of an inventive apparatus 100 for generating sensor data for controlling an autonomous vehicle in an environment in which at least one further autonomous vehicle is situated. For example, it is a factory in which autonomous transport vehicles AGV1, AGV2, AGV3, AGV4 move.

The apparatus 100 can be adapted in particular for generating sensor data by means of a sensor simulation. FIG. 2 shows a logical structure of such a simulation system. The sensor data is simulated not from the perspective of an individual autonomous transport vehicle AGV1, AGV2, AGV3, AGV4, but centrally for all guided vehicles simultaneously. In embodiments, the autonomous vehicles AGV1, AGV2, AGV3, AGV4 may be coupled to the apparatus 100 for this purpose.

In embodiments, there is a BIM model for the factory. The sensor positions of statically installed sensors CAM1, CAM2, and the type of the respective sensor and further parameters, such as visible regions of a camera CAM1, CAM2 for example, can be determined from the BIM model. The BIM model is also used to define a global coordinate system in which the autonomous transport vehicles AGV1, AGV2, AGV3, AGV4 can move. In embodiments, the autonomous transport vehicles can access the same data without a relatively long delay. This can be achieved for example by way of a broadband 5G network in the factory environment. Alternatively or in addition, any time delay can also be simulatively generated and taken into account as soon as the data is converted into the perspective of an individual AGV to be controlled.

Firstly, all sensor data of the static sensors CAM1, CAM2 and the moving sensors S11, S12, S21, . . . S23, S31, S32, S41, . . . S43 of the autonomous transport vehicles AGV1, AGV4 is generated with a global time stamp. The time stamp can be increased in discrete increments depending on how accurately the required temporal resolution was defined (for example based on the speed of the AGVs or other components of a production plant). In addition, the respective sensor positions of the sensors are stored in a global coordinate system. A sensor position of a moving sensor can change, for example, from time stamp to time stamp, for example if the sensor is mounted, for example, on a moving guided vehicle.

The generated sensor data can be distributed to all autonomous vehicles AGV1, AGV4 that are part of the sensor network. For this, the sensor data is transformed into a local coordinate system of the respective autonomous vehicle. The distribution can also be limited to the vehicles, which are potentially influenced by the data, however. An influence may be estimated for example on the basis of the BIM model. If, for example, a distance of a guided vehicle from a sensor is above a particular threshold value, the data of this sensor can thus initially be ignored. In the case of an influence, the data is transformed into the local coordinate system of the guided vehicle being considered. A particular latency time can also be included for this. This then results, for example, in an extrapolation of a movement in the future. The transformed data is then transferred to the guided vehicle currently being considered and can be evaluated by it.

FIG. 4 shows in a schematic representation a further exemplary embodiment of an inventive method.

A building, such as a production plant for example, is shown in which two autonomous transport vehicles AGV1, AGV2 and a person PER can move. The transport vehicles AGV1, AGV2 each comprise at least a sensor S11, S21, such as a camera for example. The building also comprises a statically installed camera CAM1. The respective cameras have a predefined field of vision.

The two autonomous vehicles AGV1, AGV2 are to be virtually commissioned, in other words a computer-aided simulation of a movement and/or behavior of the autonomous vehicles AGV1, AGV2 in the building is to be carried out by taking into account the building features H and/or the movement of the person PER. For this, simulated sensor data of the existing sensors is required in order, for example, to simulate a reaction of one of the autonomous vehicles to the person PER.

For this, sensor data is centrally simulated on the basis of the information of a digital building model of the building for all static and moving sensors at a predefined time. The position of the person PER and/or the autonomous vehicles AGV1, AGV2 is taken into account. A global time stamp is defined for this.

For the generation of sensor data the sensor positions of the static sensor CAM1 and the sensors S11, S21 of the autonomous vehicles AGV1, AGV2 are read in and provided in a global coordinate system predefined by the building model. Sensor data is then generated as a function of the respective sensor parameters and the respective sensor positions and taking into account the building features H and/or the person PER in coordinates of the global coordinate system, with the generated time stamp being assigned to the generated sensor data.

The generated sensor data can then be transformed into a local coordinate system of the first autonomous vehicle AGV1 and transferred to it. The first autonomous vehicle AGV1 thus also receives sensor data from the sensor S21 of the second autonomous vehicle AGV2. AGV1 can thus be controlled as a function of the transformed sensor data. For example, AGV1 thus also receives information about the person PER who, behind an obstacle H, is not detected by the sensor S11 of the first autonomous vehicle AGV1. This additional sensor data can be taken into account during the control/virtual commissioning of the first autonomous vehicle AGV1a.

FIG. 5 shows in a schematic representation a further exemplary embodiment of the inventive method.

A production plant is shown, which comprises two production machines M1, M2, and two autonomous transport vehicles AGV1, AGV2.

Embodiments of the invention enable, for example, distributed warehousing or a simulation of distributed warehousing, which is managed with autonomous transport vehicles AGV1, AGV2. Sensors of the autonomous vehicles AGV1, AGV2 can detect, for example, a stock level at different machines M1, M2.

For example, a first transport vehicle AGV1 can pick up a full stock level at a first machine M1 via the sensors of the second autonomous transport vehicle AGV2. This is made possible by way of a central generation of sensor data of all sensors in a global coordinate system with subsequent transformation of the generated sensor data into a local coordinate system of the first autonomous transport vehicle.

Thus, while the second autonomous transport vehicle AGV2 has no spare transport capacities, the first autonomous transport vehicle AGV1 can prevent overflowing of the stock level of the first machine M1 and production can thus proceed without interruption.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for generating sensor data for controlling an autonomous vehicle in a production environment in which at least one further autonomous vehicle is situated, with the following method steps:
   a) reading in an environment model of the production environment, wherein the environment model has a global coordinate system and the environment model comprises first sensor positions of static sensors in the production environment and environment information in the global coordinate system and sensor parameters of the static sensors,
   b) generating a time stamp,
   c) reading in second sensor positions and sensor parameters of sensors, which are coupled to the autonomous vehicle and the at least one further autonomous vehicle, and providing the second sensor positions in coordinates of the global coordinate system,
   d) generating sensor data for the static sensors and the sensors of the autonomous vehicle and the at least one further autonomous vehicle as a function of the respective sensor parameters and the respective first or second sensor positions and taking into account the environment information in coordinates of the global coordinate system, wherein the generated time stamp is assigned to the generated sensor data,
   e) selecting the autonomous vehicle,
   f) transforming the generated sensor data into a local coordinate system of the selected autonomous vehicle, and
   g) transmitting the transformed sensor data to a controller of the selected autonomous vehicle for controlling the selected autonomous vehicle in the production environment as a function of the transformed sensor data,
   wherein the sensor data is transformed into the local coordinate system of the selected autonomous vehicle by taking into account a transmission latency for transmitting the sensor data to the selected autonomous vehicle,
   wherein the generated sensor data is filtered as a function of the position of the selected autonomous vehicle in the global coordinate system and only the filtered sensor data is transformed into the local coordinate system of the selected autonomous vehicle and transferred to the selected autonomous vehicle, and
   wherein the sensor data is transformed into the local coordinate system of the selected autonomous vehicle as a function of previously generated further sensor data, to which a preceding time stamp is assigned, and is used to extrapolate new sensor data for a current time stamp on the basis of the previously generated sensor data.

2. The computer-implemented method as claimed in claim 1, wherein the environment model is a computer-readable building model.

3. The computer-implemented method as claimed in claim 1, wherein the sensor data for the static sensors and the sensors of the autonomous vehicles are centrally generated for the time stamp.

4. The computer-implemented method as claimed in claim 1, wherein the time stamp is updated in predefined time increments and the sensor data is generated anew for the updated time stamp.

5. The computer-implemented method as claimed in claim 1, wherein the sensor data is generated by means of a computer-aided sensor simulation.

6. The computer-implemented method as claimed in claim 1, wherein a quality of at least some of the generated sensor data is reduced to provide modified sensor data with reduced quality and the modified sensor data with reduced quality is transformed into the local coordinate system of the selected autonomous vehicle.

7. The computer-implemented method as claimed in claim 1, wherein on the basis of the generated sensor data at least one environmental feature is detected and only the detected environmental feature is transformed into the local coordinate system of the selected autonomous vehicle.

8. The computer-implemented method as claimed in claim 1, wherein the static sensors and the sensors of the autonomous vehicles and/or the autonomous vehicles are connected together by a communications network.

9. The computer-implemented method as claimed in claim 1, wherein the selected autonomous vehicle is controlled in a simulation environment as a function of the transformed sensor data.

10. The computer-implemented method as claimed in claim 1, wherein the production environment is a factory and the autonomous vehicles are driverless transport vehicles.

11. A computer program product comprising a non-transitory computer readable hardware storage device having computer readable program code stored therein, said program code executable by a processor of a computer system to implement the method as claimed in claim 1.

12. An apparatus for generating sensor data for controlling an autonomous vehicle in a production environment in which least one further autonomous vehicle is situated, wherein the apparatus comprises:
   a) a first interface, which is adapted to read in an environment model of the production environment, wherein the environment model has a global coordinate system and the environment model comprises first sensor positions of static sensors in the production environment and environment information in the global coordinate system and sensor parameters of the static sensors,
   b) a time stamp generator, which is adapted to generate a time stamp,
   c) a second interface, which is adapted to read in second sensor positions and sensor parameters of sensors, which are coupled to the autonomous vehicle and the at least one further autonomous vehicle, and to provide the second sensor positions in coordinates of the global coordinate system,
   d) a sensor data generator, which is adapted to generate sensor data for the static sensors and the sensors of the autonomous vehicle and the at least one further autonomous vehicle as a function of the respective sensor parameters and the respective first or second sensor positions and taking into account the environment information in coordinates of the global coordinate system, wherein the generated time stamp is assigned to the generated sensor data,
   e) a selection module, which is adapted to select the autonomous vehicle,
   f) a transformation module, which is adapted to transform the generated sensor data into a local coordinate system of the selected autonomous vehicle, and
   g) a transmission module, which is adapted to transmit the transformed sensor data to a controller of the selected autonomous vehicle for controlling the selected autonomous vehicle in the production environment as a function of the transformed sensor data,
wherein the sensor data is transformed into the local coordinate system of the selected autonomous vehicle by taking into account a transmission latency for transmitting the sensor data to the selected autonomous vehicle,
wherein the generated sensor data is filtered as a function of the position of the selected autonomous vehicle in the global coordinate system and only the filtered sensor data is transformed into the local coordinate system of the selected autonomous vehicle and transferred to the selected autonomous vehicle, and
wherein the sensor data is transformed into the local coordinate system of the selected autonomous vehicle as a function of previously generated further sensor data, to which a preceding time stamp is assigned, and is used to extrapolate new sensor data for a current time stamp on the basis of the previously generated sensor data.

* * * * *